United States Patent [19]

Adams

[11] Patent Number: 5,422,012

[45] Date of Patent: Jun. 6, 1995

[54] TECHNIQUE FOR SEPARATING SOLIDS FROM DRILLING FLUIDS

[75] Inventor: Ernest K. Adams, Brazos County, Tex.

[73] Assignee: JRS Investments, Inc., Corpus Christi, Tex.; a part interest

[21] Appl. No.: 293,027

[22] Filed: Aug. 19, 1994

[51] Int. Cl.6 .................................................. C02F 1/52
[52] U.S. Cl. .................................... 210/712; 210/723; 210/747
[58] Field of Search ................ 210/712, 727, 723, 747

[56] References Cited

U.S. PATENT DOCUMENTS

| | | | |
|---|---|---|---|
| 4,482,459 | 11/1984 | Shiver | 210/727 |
| 4,725,362 | 2/1988 | Dugat | 210/710 |
| 4,913,585 | 4/1990 | Thompson et al. | 210/728 |

Primary Examiner—Neil McCarthy
Attorney, Agent, or Firm—G. Turner Moller

[57] ABSTRACT

A method of removing suspended solids from drilling fluid includes preparing a dilute solution of flocculant and water, delivering a batch of the drilling fluid into the solution and agitating the mixture. The solids flocculate and then separate readily leaving a generally clear water layer on top of a solids layer. The solids are removed from the mixture by delivering them to a solids-liquid separator such as a shale shaker where the solids are discarded and the water is reclaimed and reused. Preferably, drilling mud is treated to remove solids while a well is being drilled and the reclaimed water is used in subsequent drilling operations.

5 Claims, 1 Drawing Sheet

TECHNIQUE FOR SEPARATING SOLIDS FROM DRILLING FLUIDS

This invention relates to a method of removing solids from drilling fluids or other fluids containing undesirable solids by flocculating the solids into particles of a size that can be readily separated.

BACKGROUND OF THE INVENTION

The technology of drilling oil and gas wells has evolved, and is evolving, in response to a variety of stimuli. It has manifestly become important to conduct drilling operations in a manner which is not substantially damaging to the environment. One aspect of this is to handle and dispose of spent drilling fluid and drilled solids.

In a conventional well drilled with a conventional water based mud, the spent drilling fluid and drilled solids accumulate in one or more pits near the drilling rig. Typically, after drilling operations are complete and the rig moved away, the earthen dike on the reserve pit is broken and the spent drilling fluid spread in the pasture where the well was drilled. The shale pit, containing largely drilled solids, is simply covered up. This technique was widely used, and is still widely used, in many areas.

There are some situations where it is necessary or desirable to dispose of drilled solids and spent drilling fluid in a more formal manner. For example, farmers often require drilled solids and spent drilling fluid to be hauled from the site so as not to diminish the agricultural productivity of the land. In offshore wells, or wells drilled in or near inland bays, fresh water lakes, rivers and the like, it is often necessary to haul drilled solids and spent drilling fluid from the site. Other situations, such as wells drilled near cities, require disposal of drilled solids and spent drilling fluid.

The original technique was to run the spent drilling fluid and drilled solids through a cyclone type separator or centrifuge providing one outlet stream having a high proportion of solids and another outlet stream having a high proportion of liquid. The volume of the solids, although high, is small compared to the volume of liquid. The liquid is mostly water but contains so much fine grained material or silt that it cannot be handled or treated like water. In other words, the liquid discharge from a cyclone separator still contains so much solids that it is disposed of as if it were a troublesome material.

In response to this dilemma, attempts have been made to add flocculants to drilling mud, spent drilling mud and the liquid discharge from running drilling mud or spent drilling mud through a cyclone separator. The concept is to flocculate the solids in the liquid to create larger sized particles that will drop out of suspension or which can readily be separated to leave a substantial volume of water that can be treated as simply water. The concept of adding a flocculant to a drilling mud for the purpose of dropping solids out of suspension is known as shown in U.S. Pat. Nos. 3,737,037; 4,127,482; 4,234,421; 4,353,803; 4,457,842; 4,913,585 and 5,093,008. It is this type approach that this invention most nearly relates.

The prior art approach is to add a flocculant to the drilling mud or to mix flowing streams of flocculant and drilling mud. The attempt has been to minimize the volume of the flocculant solution because a very dilute flocculant adds more water and thus more volume to the material being separated thereby compounding the disposal of the liquid fraction.

There are numerous difficulties with the prior art approaches. The prior applications are not effective when a drilling fluid is dispersed with lignosulfonates and other thinners or dispersants.

As the percentage of solids increases, the internal addition of flocculants into drilling mud tends to increase its viscosity. This makes separation of the liquid and solid phases much more difficult. One example of a very high solids drilling mud is the discharge from a mud cleaner, cyclone or centrifugal separator.

The same problem occurs with liquids that are highly viscous before the addition of flocculant. The internal addition of flocculant to a rather viscous drilling mud makes the mud even more viscous. As in the case of high solids drilling muds, this makes separation of the liquid and solid phases much more difficult.

SUMMARY OF THE INVENTION

As used herein, the term drilling mud or drilling fluid is intended to include water suspensions of drilled solids obtained from drilling rock formations in the earth. These solids are suspended in a water solution containing additives normally found in well drilling operations such as lignite, lignosulfonate, bentonite, barite, caustic soda, polymer and the like. Thus, drilling mud may be directly out of a well and in good enough shape to be reconditioned in a mud pit or tank for immediate reuse, as by injection into the drill pipe. Drilling mud may be the remains in a reserve pit at the end of the drilling operation, the accumulation of water and drilled solids found in a solids or shale pit or the liquid discharge from a cyclone separator or centrifugal separator.

In this invention, drilling mud is delivered into a tank compartment having therein a bath of flocculant and water. The amount of flocculant should be enough to be effective but not an excessive amount and is usually in the range of about 0.01-0.5 pounds of flocculant per barrel of water. The flocculant bath attacks the solids externally causing the solids in the drilling mud to cling together into much larger sized particles. Because of their size and weight, these agglomerated particles tend to drop out of suspension and can accordingly be readily separated from the water in which they reside.

When starting a batch of drilling mud, the dilute flocculant solution is delivered to the tank compartment and the drilling mud is then added. The contents are agitated to mix the flocculant and the drilling mud to agglomerate the drilled solids. Agitation may be slowed or stopped, allowing the solids to fall out of solution or the contents of the tank compartment may be immediately pumped to a separator such as a conventional shale shaker used to separate large drilled solids from drilling mud just emitting from the well. The shale shaker has one discharge that is mainly flocculated solids and another discharge that is mainly water and any dissolved chemicals. Part of the water is delivered back to the tank compartment, mixed with an appropriate amount of flocculant and another batch of drilling mud is then delivered to the compartment and the process repeated.

The water from the shale shaker is substantially solids free although it may contain considerable dissolved materials. In a typical application of this invention, the liquid separated from the flocculant bath contains dissolved chemicals such as lignosulfonate, polymer or caustic soda, which are normal additives of drilling mud. The liquid is thus ideally suited for reuse in the drilling operation because these dissolved chemicals are bought and added every day to maintain the mud system. Thus, a substantial advantage of this invention is to reuse the water reclaimed from drilling mud. In this fashion, dissolved chemicals in the water are reused, rather than replaced. Thus, a very desirable application of this invention is to separate drilled solids from drilling mud, deliver the solids to a disposal operation and reuse the water to continue drilling operations. Thus, the remainder of the water from the shale shaker is either immediately delivered to the rig water system for reuse, immediately disposed of or put into another compartment of the tank and allowed to settle.

One would think it foolish to mix a great deal of fresh water and a drilling mud where the idea is to separate the solids from the water. In this invention, however, the separation is so efficient, the water added by the dilute flocculant does not create disposal problems, primarily because the water can be reused so readily. In addition, the water used in one batch of this process has normally been recovered from an earlier batch.

It is an object of this invention to provide an improved technique for flocculating solids in a drilling fluid.

Other objects and advantages of this description will become more apparent as this description proceeds, reference being made to the accompanying drawings and appended claims.

DETAILED DESCRIPTION

Figure 1:
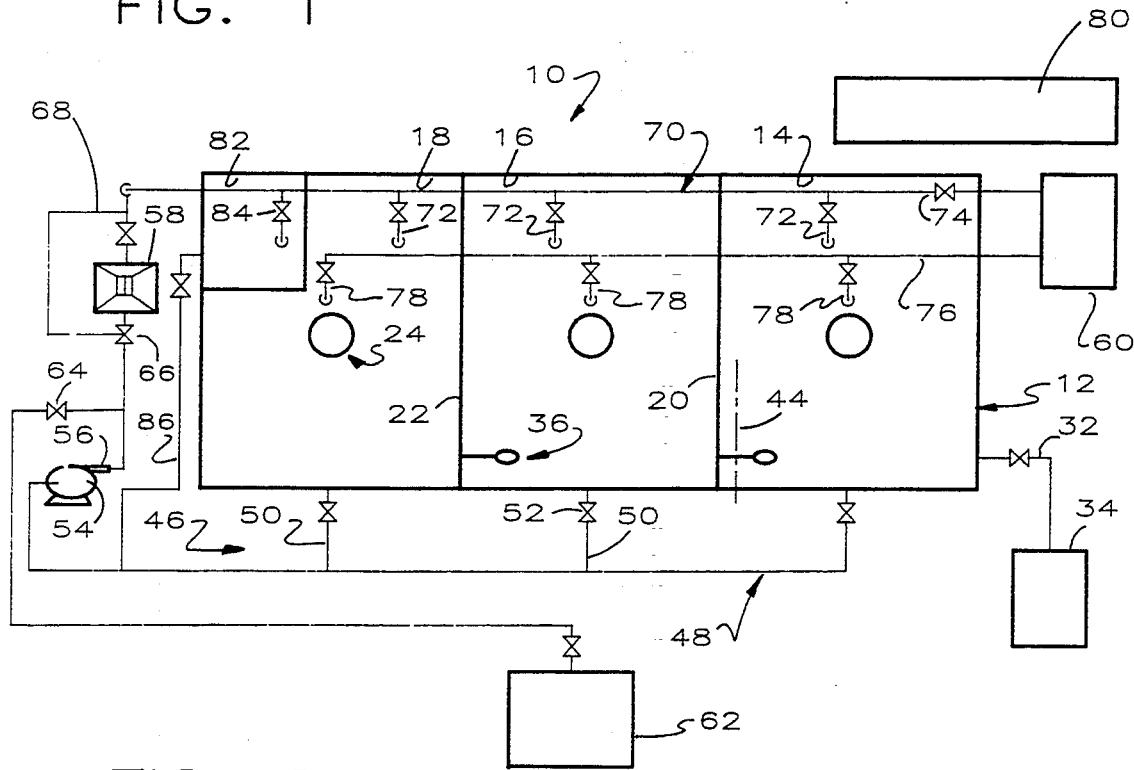
FIG. 1 is a top schematic view of the device of this invention.
Figure 2:
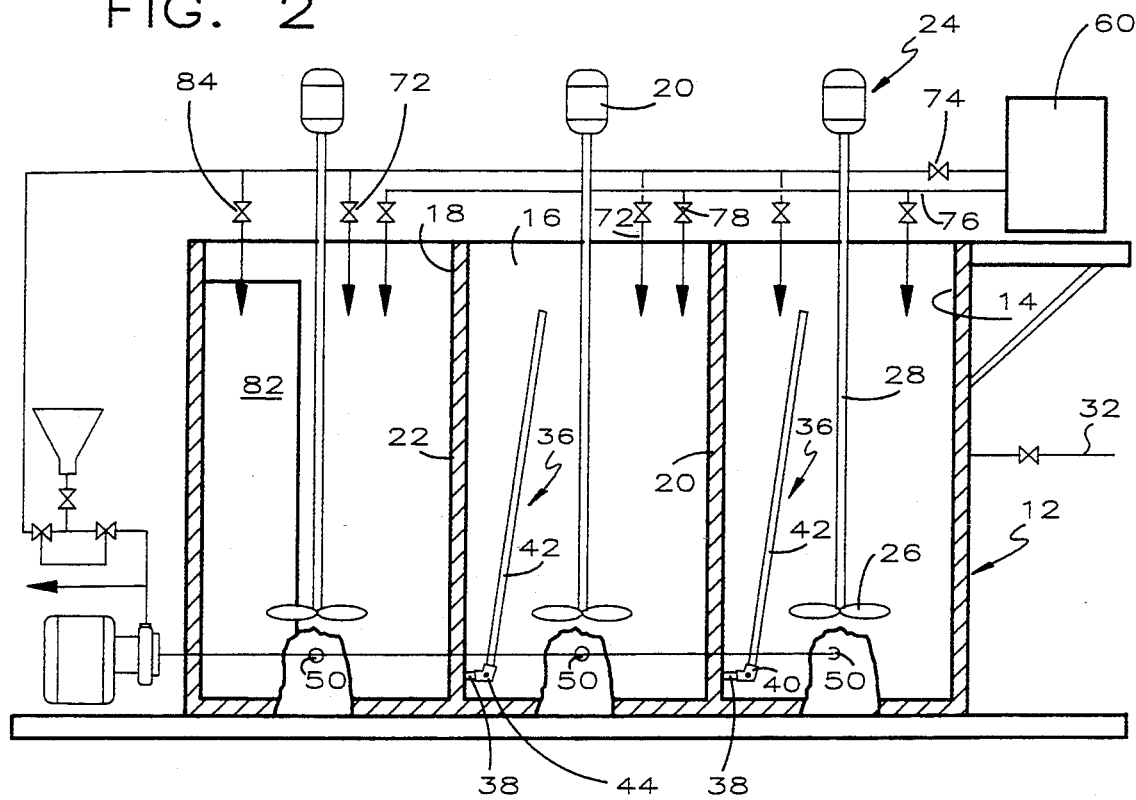
FIG. 2 is a cross-sectional view of the device of FIG. 1, taken substantially along line 2—2 thereof as viewed in the direction indicated by the arrows.

Referring to FIG. 1, drilling mud is delivered to a treater 10 comprising a large tank 12, similar in size to conventional mud tanks, having a plurality of compartments 14, 16, 18 provided by a pair of partition walls 20, 22. Each of the compartments 14, 16, 18 includes an independently operable agitator 24 such as a blade or propeller 26 connected by a shaft 28 to an electric motor 30. Conveniently, the agitators 24 may be suspended from a walkway (not shown) extending along the long dimension of the tank 12. A valved inlet 32 connects to a source 34 of drilling fluid to be treated.

As previously mentioned, the drilling fluid are water suspensions of drilled solids obtained from drilling rock formations in the earth and may be directly out of a well and in good enough shape to be reconditioned in a mud pit or tank for immediate reuse, may be the remains in a reserve pit at the end of the drilling operation, may be the accumulation of water and drilled solids found in a solids or shale pit or may be the liquid discharge from a cyclone separator or centrifugal separator.

As a general rule, water based drilling fluids include a viscosifier to make the liquid thick enough to carry cuttings, a water loss control material or materials to reduce the loss of water in the drilling fluid to permeable formations encountered in the well, pH control materials for increasing the pH of the drilling mud and thereby reducing shale swelling, weight material for increasing the density of the drilling fluid and thereby increasing the hydrostatic weight of a column of the drilling fluid to control the pressures of the formations encountered and a variety of specialized additives such as lubricants or other specialized materials.

The standard viscosifier used in drilling muds is bentonite which is often called gel. Other materials, such as a polymer known as XCD, made by Kelco Rotary, are also commonly used. Bentonite is a naturally occurring swellable clay and has been used for decades as the standard viscosifier in drilling muds. The purpose of raising the viscosity is to enable the drilling fluid to carry cuttings upwardly in the hole. Another advantageous side effect of bentonite as a viscosifier is that when the mud is quiescent, it forms a thick gel or semi-solid from which cuttings do not readily fall out.

There are many water loss control materials used or suggested for use in drilling fluids. Bentonite has a water loss control capability, to a point, because the swollen clay particles are swept onto the face of a permeable formation by escaping water to produce a soft, gummy filter cake which somewhat retards water loss into a permeable; formation. Powdered lignite, sodium polyacrylates, sulfonated asphalt, polyanionic cellulose and other materials have long been used as water loss control materials. When added in proper proportions to a water based, bentonite mud system, the water loss to permeable formations can be reduced to tolerable amounts.

It is normally desirable that drilling muds have a high pH to control shale swelling and for other reasons. Caustic soda is almost universally used for this purpose.

The standard weight material used in drilling muds is powdered barite which is barium sulfate. Hematite or iron oxide is also used in some circumstances. Unweighted mud systems typically exhibit a density of about 9.5 pounds/gallon or less, up from 8.3 pounds/gallon for fresh water. The increase in density is largely caused by small cuttings suspended in the drilling mud. To achieve mud densities above about 9.5 pounds/gallon, weight material is added.

The compartments 14, 16 each provide a skimmer 36 comprising a conduit 38 opening into the downstream compartment 16, 18, a Chiksan joint 40 and a long upstanding conduit 42. The Chiksan joint 40 allows the conduit 42 to rotate about an axis 44 and thus move parallel to the partition walls 20, 22. This effectively raises or lowers the open upper end of the conduit 42 and thereby draws off or skims liquid off the top of the compartments 14, 16 and delivers it to the downstream compartments 16, 18 until the liquid levels in the compartments 16, 18 equalizes.

The treater 10 also comprises means 46 for withdrawing a liquid or slurry from the bottom of the compartments 14, 16, 18 and delivering it to a desired location. To this end, a manifold 48 includes a conduit 50 having a valve 52 therein opening into the bottom of each of the compartments 14, 16, 18. A pump 54 provides an inlet in communication with the manifold 48 and an outlet 56. The pump outlet 56 is manifolded to deliver to a mixing hopper 58, to a solids-liquid separator 60 to the compartments 14, 16, 18, or to the water system 62 of a drilling rig. The separator 60 may be a cyclone separator, mud cleaner or the like but is preferably a shale shaker of the type commonly used on drilling rigs, i.e. a device having an inclined vibrating screen through which the liquid passes while the solids are deflected off the device.

To these ends, a conduit 64 having a valve 66 therein connects to the water system 62 and a three way valve 66 connects to the hopper 58 and to a valved bypass 68 around the hopper 58. A manifold 70 leads to the shale shaker 60 and includes a valved outlet 72 over each of the compartments 14, 16, 18 and a valve 74 near the inlet of the shale shaker 60. An outlet 76 from the shale shaker 60 provides a valved outlet 78 over each of the compartments 14, 16, 18.

A number of different operations are performed with the treater 10 in the process of removing suspended solids from drilling mud. At the outset, the compartment 14 is partially filled, e.g. 15–30%, with a dilute solution of flocculant and water. To this end, enough water to treat one batch of drilling mud is pumped from the rig water system 62 into the compartment 14. The valved outlet 52 is then opened, the valve 66 is opened to the hopper 58, the valve 74 is closed, the valve 72 opening into the compartment 14 is opened and the pump 54 started. The necessary amount of powdered flocculant is poured into the hopper 58 and mixed with the water as the water is being pumped through the hopper 58.

The amount of flocculant used is an effective, but not excessive, amount to flocculate the solids in the drilling mud being treated. This varies slightly with the particular flocculant being used but, with tested flocculants, is usually about 0.01–0.5 pounds of flocculant per barrel of water and preferably about 0.025–0.1 pounds of flocculant per barrel. The particular flocculant used is subject to wide variation but one successful material is a polyacrylamide known as MF1 which is available from Kelco Rotary, Inc. of Houston, Tex.

After the compartment 14 is partially filled with the dilute flocculant-water solution, the drilling mud to be treated is delivered from the source 34 through the valved inlet 21 into the compartment 14. The act of pumping the drilling mud to be treated into the compartment 14 causes considerable mixing of the drilling mud and flocculant solution. If further agitation is required, the electric motor 30 is used to drive the blade or propeller 26. In a very short time, the solids in the drilling mud have agglomerated together into much larger particles and are of a size that can be readily separated by the shale shaker 60. At this time, the liquid in the compartment 14 is no longer a drilling mud because a substantial proportion of the solids will rapidly settle out into the bottom of the compartment 14 if agitation is stopped.

The next step is to remove the flocculated solids from the batch of material in the compartment 14. To this end, the valve 52 leading to the compartment 14 is opened, the valve 66 is positioned to bypass the hopper 58, the valves 72 are closed, the valve 74 is opened and the valve 78 leading into the compartment 16 is opened, the other valves 78 being closed. When the pump 54 is started, the mixture of water and agglomerated solids is pumped out of the compartment 14 and through the shale shaker 60. Solids coming off the shale shaker 60 are delivered to a solids pit or catch 80 for disposal in a conventional manner. The water passing through the shale shaker 60 is delivered to the compartment 16.

The next step is to treat another batch of drilling mud in the compartment 14. To do so, another batch of dilute flocculant solution is mixed, this time using water from the compartment 16. Thus, the valve 52 is opened, the valve 66 is opened, the valve 74 is closed, the valve 72 leading to the compartment 14 is opened and the pump 54 is started. The necessary amount of powdered flocculant is poured into the hopper 58 and mixed with the water as the water is being pumped through the hopper 58.

Another batch of drilling mud is then delivered into the compartment 14 and treated. The water from the shale shaker 60 is again delivered to the compartment 16. Clear water from the compartment 16 is periodically skimmed into the compartment 20 by lowering the skimming conduit 42. Although most of the solids are discharged from the shale shaker 60 from material pumped out of the compartment 14, the compartment 16 ultimately collects a significant amount of suspended solids which may be flocculated or unflocculated. If the solids appear to be flocculated, the contents of the compartment 16 are pumped into the shale shaker 60 and the flocculated solids removed. If the solids appear not to be flocculated, a batch of dilute flocculant solution is prepared and pumped into the compartment 14 and then the contents of the compartment 16 are delivered into the compartment 14 and treated in the same manner as drilling fluid.

It will be apparent that any of the compartments 14, 16, 18 can be used as the main treating compartment with the remaining compartments being used to clarify water coming from the shale shaker 60. Preferably, this invention is used concurrently with the drilling of a well and the reclaimed water is delivered to the rig water system 62 and used in subsequent operations to drill a subsequent part of the hole.

Another feature of the invention comprises a separate tank 82 inside the compartment 18 that may be used to mix a batch of dilute flocculant. With the valve 74 closed, a valve 84 is opened to deliver the output from the pump 54 to the tank 82 so the tank 82 can be filled with water from either the rig water system 62 or from some other source. A valved outlet conduit 86 connects to the pump 54 so the tank 82 can be circulated. It is accordingly apparent that the dilute flocculant solution can be created by adding flocculant through the hopper 58 as the tank 82 is being filled or while the tank 82 is being circulated.

The efficiency of the method of this invention can be easily demonstrated. A quantity of fresh drilling mud is passed through a cyclone separator and the liquid fraction is placed in a first small bottle. The solids in the bottle are so fine they do not settle out of solution. A second small bottle is partially filled with a 0.1% flocculant solution amounting to about a third of the volume of the separator liquid fraction. The contents of the first small bottle are poured into the flocculant bottle which is shaken. The drilled solids flocculate immediately and drop out of suspension providing a large layer of clear water on top of a solids layer. Even visually, it is apparent that the volume of the solids layer is much Less than the volume of the separator liquid fraction.

In a test, 525 barrels of 9.8 to 10.3 ppg drilling mud was received from a well being drilled in Timbalier Bay, Lafouche Parish, La. and known as the Greenhill Petroleum #84 Timbalier Bay. The test started with 120 barrels of clear drilling water for a total of 645 barrels. Using this invention, 100 barrels of solids were removed from the drilling mud and 545 barrels of solids free water was recovered and reused as drilling water in the well being drilled.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A method of removing drilled solids from drilling fluid, comprising providing a tank partially filled with a flocculant-water solution substantially free of suspended drilled solids;

then adding drilling fluid, including drilled solids and water, to the tank and flocculating the drilled solids;

then delivering a mixture of the flocculated drilled solids and the water to a separator and separating the mixture into a first stream comprising mainly flocculated drilled solids and a second stream comprising mainly water; and collecting the first stream.

2. The method of claim 1 further comprising collecting the second stream, creating a drilling fluid fraction by mixing the second stream, a viscosifier, a water loss control material and a pH control material, and then drilling a hole in the earth with the drilling fluid fraction.

3. The method of claim 2 wherein the flocculant solution comprises 0.025–0.1 pounds of flocculant per barrel of water.

4. The method of claim 2 wherein the flocculant solution comprises 0.01–0.5 pounds of flocculant per barrel of water.

5. The method of claim 3 wherein the water in the tank mixed with the flocculant was recovered from the drilling fluid.

* * * * *